Patented Nov. 10, 1925.

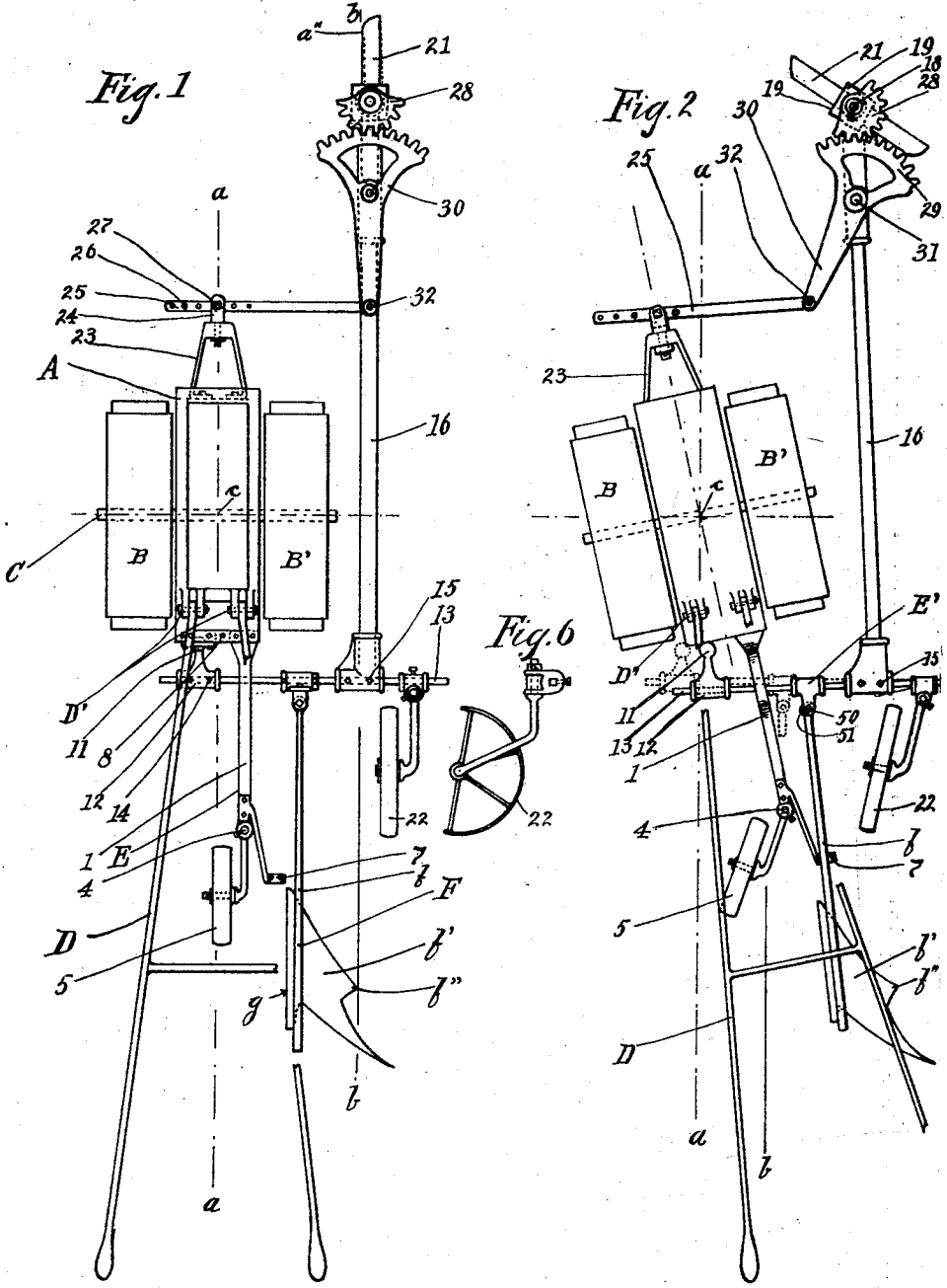

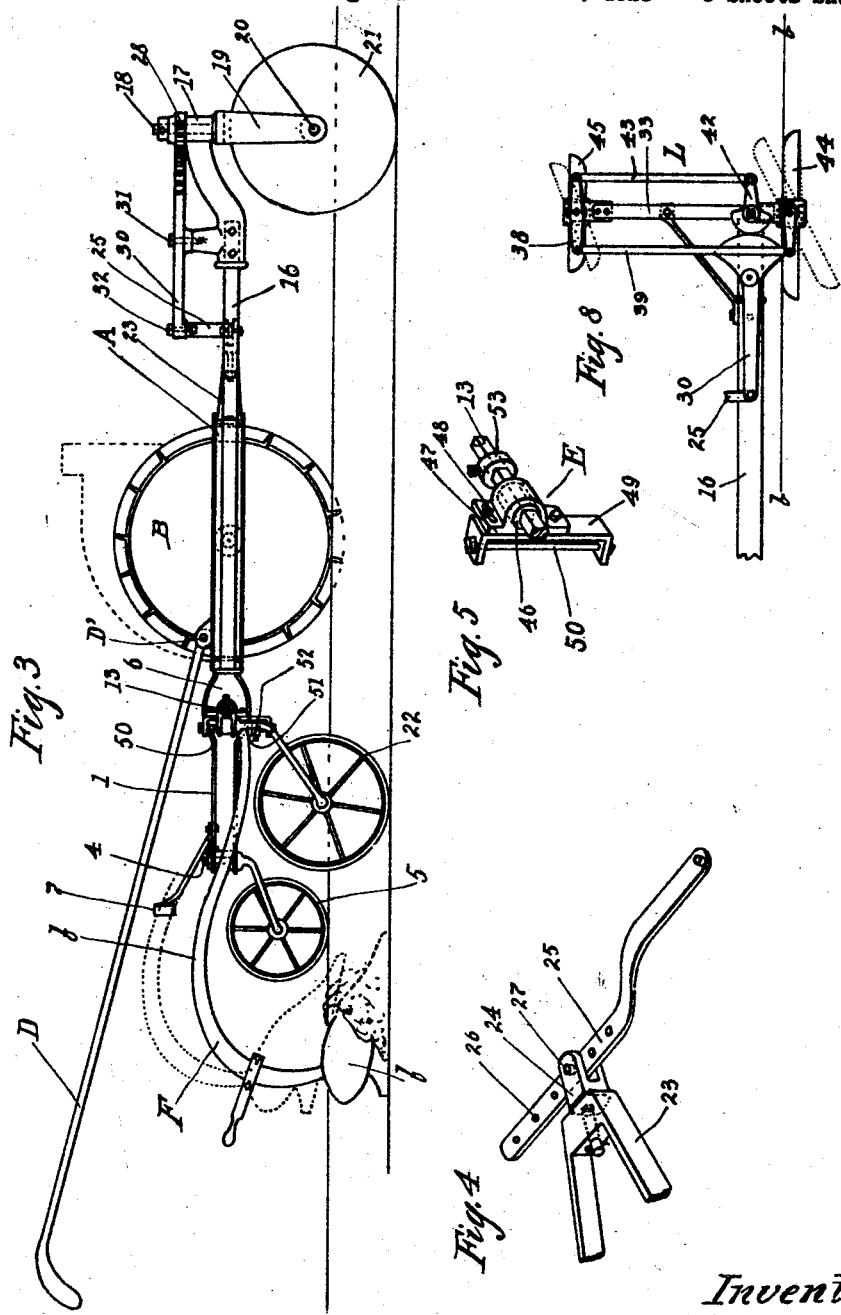

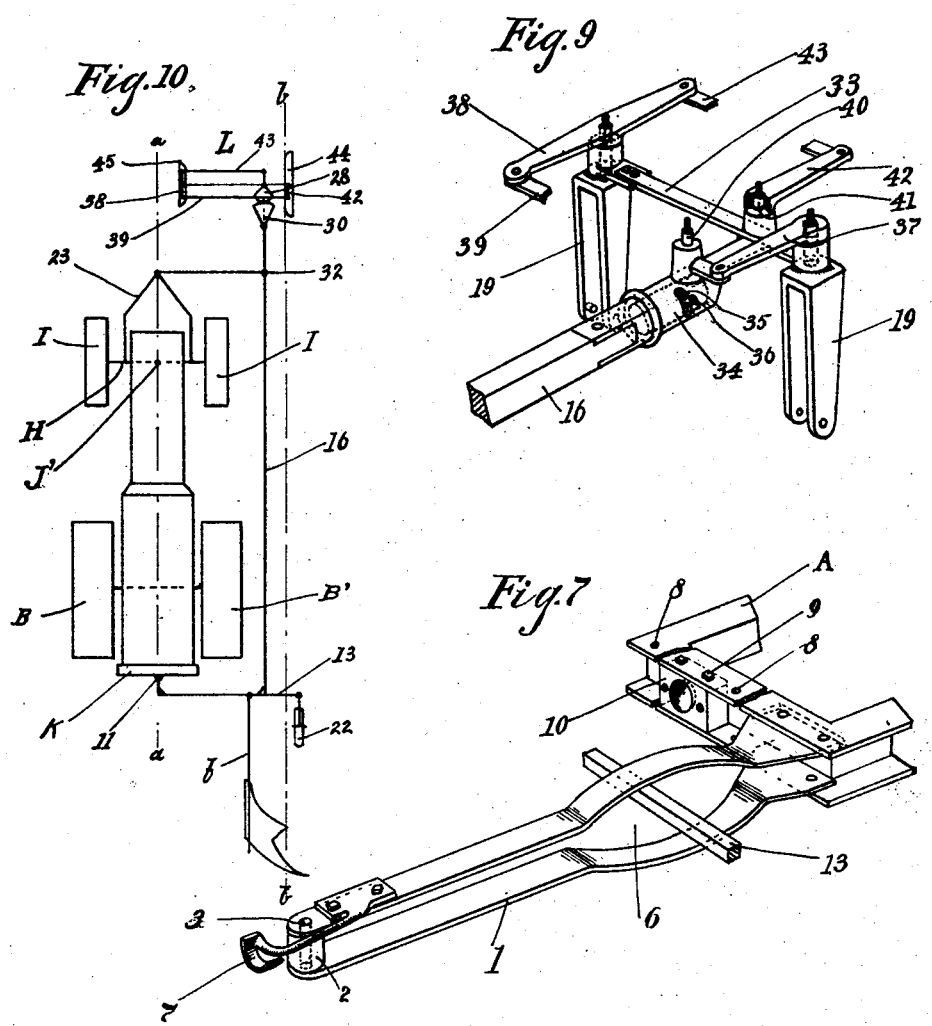

1,560,797

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO SAID PAUL HANSMANN.

COMBINATION ANTISIDE DRAFT PLOW HITCH AND TRACTOR GUIDE.

Application filed December 21, 1920, Serial No. 432,241. Renewed April 7, 1925.

*To all whom it may concern:*

Be it known that we, PAUL HANSMANN and HERMAN STRACK, citizens of the United States, residing at Long Prairie, in the county of Todd and State of Minnesota, have invented certain new and useful Improvements in Combination Antiside Draft Plow Hitches and Tractor Guides, of which the following is a specification.

This invention relates to tractor guides and balanced plow hitches, it being a combination of both, and adapted for use in connection with either two or four wheel tractors or any other type of engine suitable for pulling farm implements.

An object of our invention, is to provide improved means, whereby a plow may be so positioned behind the tractor, as to cut a furrow in the path of one of the traction wheels, to enable the tractor to run on level or unplowed ground, thereby avoiding the excessive side wear in the engine parts, resulting from the tilted position the tractor assumes when running with one wheel in the furrow. Further, a great saving of traction capacity is effected when running on level ground, in that the traction wheels engage the ground with the full width of their rims, which is not the case when the tractor is tilted.

To cut a furrow in the position above described, the plow is hitched to one side of the center of draft of the tractor, behind one of the traction wheels, thereby shifting the greater part of the resistance of the plow to said wheel. If the tractor is of the two wheel type, shifting of the load will tend to turn the tractor around the loaded traction wheel, which the operator can prevent only by vigorously operating the steering mechanism. When so hitched to a Beeman garden tractor (shown diagrammatically in the accompanying drawings) it has been found, by experiment, that the operator cannot prevent the tractor from running into the furrow.

As is well known, a plow offset, with respect to the center of draft of the tractor, will constantly tend to move in a diagonal or resultant direction toward said center of draft, thereby setting up a heavy side draft at the landside of the plow.

A further object of our invention is to provide improved means, whereby said tendency of the plow to move in a resultant direction will be effectively counteracted, and the tendency of the tractor to run out of its course, automatically prevented.

A still further object of the invention, is to provide a device of the class described, which will function as an anti-side draft plow hitch and at the same time as an automatic tractor guide, whereby the tractor is steered automatically to keep it travelling in parallelism with the furrow; and, in addition, as an automatically operated guide to assist in turning the tractor around, as at the headland.

A still further object of our invention is to provide a new and novel arrangement of that part of the device, which constitutes the counteracting element, for counteracting or balancing any abnormal tendencies in the plow to deviate from a straight ahead movement due to its offset position relative to the center of draft of the tractor, whereby said element is rendered more effective, in that the leverage opposing the plow movement, can be made (due to its position relative to the tractor) greater than if it were otherwise positioned.

To this end, the invention consists in the construction, combination and arrangement of parts, one form of which is shown in the accompanying drawings forming part of this specification.

Figure 1, is a diagrammatic top view of a two wheel tractor, known as the Beeman garden tractor, showing the invention attached thereto.

Figure 2 is a similar view showing the tractor slightly turned to the left and the consequent positions assumed by the movable parts of the invention.

Figure 3 is a side elevation of Figure 1.

Figure 4 is a perspective view of the link connection forming part of the automatic steering mechanism, and its swivel support on the tractor.

Figure 5, is a perspective view of the pivotal plow connection at the forward end of the plow frame.

Figure 6 is a fragmentary side view of the rear caster wheel support.

Figure 7, is a fragmentary perspective view of the rear end of the engine frame, showing the tractor stabilizer caster wheel frame, and the plow support on the rear end thereof.

Figure 8 is a plan view of the forward wheeled support of the invention forming part of the tractor guiding mechanism to be used for four wheel tractors.

Figure 9 is a fragmentary perspective view of the frame work of the mechanism represented in Figure 8, and Figure 10 is a diagrammatic plan view of a four wheel tractor equipped with the invention.

Our invention may be termed a combination anti-side draft plow hitch and engine guide, in that a part of the plow hitch simultaneously serves as an engine guide.

In the drawings, A represents the frame, and B and B′ the traction wheels of a two wheel tractor. C represents the axle for the wheels, and D a steering handle, having pivotal connection by means of the pivot pins D′ with the frame A. The pivot D′ is positioned parallel with the axle so that the handle is swingable in a plane parallel with that of the wheels. The engine of the tractor (not shown) is ordinarily controlled from the handle D by mechanism not shown. Midway between the wheels and coincident with a plane parallel with those of the wheels is the dash-line $a$—$a$, indicating the center of draft of the tractor. The frame A here shown is rectangular in shape and constructed of channel iron, channel side out. Extending rearwardly longitudinally of the frame and firmly secured thereto, is the tractor stabilizer element E, comprising an arm 1, having a hub 2 with a vertical bore 3, wherein is journaled the angular arm 4 of the caster wheel 5. The stabilizer prevents the engine from tilting, the caster 5 forming a rolling support for the tractor, which swivels on its pivot 4, when the tractor is turned bodily by the operator, by means of the handle D. When turning the tractor in this manner, it rotates about the center $c$, established at the intersection of the axis C and the center of draft $a$—$a$, the wheel B moving rearwardly and B′ forwardly as shown in Figure 2 of the drawings. The arm 1 is formed with a clearance opening 6 cut through its side, and carries at its outer end, the rearwardly and laterally extending plow support formed with a hook 7, which latter is so positioned as to hold the frame of the plow in elevated position. In the rear cross member of the frame A, are a plurality of bolt holes 8 to receive bolts 9, whereby is held firmly positioned the socket member 10 of the ball and socket connection 11 (Figure 1). By providing a row of holes 8, the socket member may be adjusted along the rear of the frame to change its relative distance from the center of draft $a$—$a$. By using a single caster wheel as a rear support for the tractor, as distinguished from the usual twin casters ordinarily provided on Beeman tractors, we secure a three point ground contact, as well as adjacent available supporting means for the plow, support 7 in that the arm 1 is in close parallelism with the plow frame. The ball member of the ball and socket connection is formed with a sleeve 12, longitudinally adjustable on the horizontally disposed squared bar 13 by means of set screws 14, said bar being parallel with the axle C. The bar extends outwardly across the line $a$—$a$ indicating the center of draft of the tractor, and a distance beyond the traction wheel B′. Extending forwardly at right angles to the bar 13, and set screwed so as to be adjustable longitudinally thereon as by means of the set screws 15, and positioned in parallelism with the line of travel of the tractor, when the latter is traveling in a straight ahead course, is the reach member 16. The forward end of the reach member is located a considerable distance in advance of the tractor and to one side thereof and is formed with a hub 17, (Figure 3) having a vertical bore, wherein rotates the stem 18 of the vertically disposed fork 19, which latter is similar to the forks 19 shown in Figure 9 of the drawings. Positioned in the crotch of the fork and rotatably mounted on the bearing pin 20, is the guide wheel 21. The longitudinal axis of the stem 18 is in direct vertical alignment with the axis of the pin 20, so that any side-skidding movement or tendency which may be imparted to the wheel, by a bodily movement of the rigidly connected reach member 16 and bar 13, (constituting, as a whole a large angular lever), will meet with the same ground resistance, as would be the case if the fork 19 were a rigid part of the reach. Thus, the wheel 21 when positioned with its plane in parallelism with the center of draft $a$—$a$, constitutes an effective ground engaging anchor to resist the tendency of any rearward pull (such as the resistance set up by a plow) at or near the juncture of the reach member and the bar 13, to swing the angular lever upon its fulcrum. By effectively resisting the tendency, side draft at the landside $g$ of the plow is eliminated. Near said juncture on the bar 13, by means of the plow connection E′, (Figure 5) and located between the reach member and the ball and socket connection 11, is connected the plow F, consisting in part of the usual frame $f$, and the share $f'$. As shown, the plow is positioned to cut a furrow partly in the trail of traction wheel B′, the point $f''$ of the share extending to the line $b$—$b$, which latter indicates the position of the vertical wall of the last adjacent furrow. Mounted on the bar 13 outside of the reach member 16, is the furrow caster 22, which latter constitutes a wheeled support for the elbow of the angular lever, said caster traveling in the bed of the furrow and being constructed to readily respond to any turning movement of the tractor after the fashion of the stabilizer caster 5. The ball and socket joint 11 constitutes a fulcrum for the angular lever, so that the rearward movement of the latter will tend to turn the angular lever upon its fulcrum and thereby tend to skid the guide wheel 21 to the right. The frictional engagement of the wheel with the ground effectively balances said skidding tendency. Obviously, the leverage around the fulcrum 11 for opposing the skidding tendency of the guide wheel increases as the length of the reach portion of the angular lever. By our improved construction, namely, of extending the ground engaging element or anchoring element (constituted by the angular lever and its wheel supports 21 and 22) for opposing any resultant movement of the plow, along side and to a point in advance of the tractor, the reach can be made much longer, than when the anchoring element is arranged to the rear of the tractor along side of the plow; because in the latter case, the length of the reach is restricted by the length of the handle D, which latter determines the position of the operator who stands on the ground so as to conveniently manipulate the handle. As a safe clearance must be allowed to avoid possible injury to the operator, by the lateral sweeping movement of the anchoring element when making a turn, the length of the latter becomes so inadequate, that a heavy cumbersome structure must be provided to lend weight, to render the frictional engagement with the ground adequate to effectively counterbalance the tendency of the plow to move in a resultant direction toward the point $c$. As all the space forward of the tractor is available, the length of the angular lever may be made to meet the requirements of any sized plow or gang of plows. This feature of extending the ground engaging element along side of the tractor is especially convenient in connection with large four wheel tractors as shown in Figure 10. Here the reach of the angular lever, from its fulcrum 11 to the guide wheel 21, exceeds materially the length of the tractor, thereby affording a powerful leverage capable of balancing a gang of many bottoms.

It will be noted, that the pivotal connection of the tractor is located nearly midway between the plow share and the point of contact with the ground of the anchoring element, so that the latter is pulled forward from the rear of the tractor as distinguished from being pushed forward by the front of the tractor. The slenderness of the angular lever and the necessity of maintaining a constant relative position between it and the tractor, in the process of plowing, renders the device unpractical, in that the character of the work to be done, and the nature of the soil tend to disturb said relative position. Further, in making a turn the ground element must be controlled to follow the tractor. To accomplish this we have provided controlling mechanism extending from the ground element to the tractor, for the purpose of controlling both. The controlling mechanism comprises a bracket 23, extending forwardly from the front of the frame A, and having journaled in its forward end a swivel block 24, the axis of rotation of the block horizontally disposed and preferably in alignment with the center of draft of the tractor. The block is bifurcated to loosely receive the flat link 25, the latter having a row of holes 26 to receive the pivot pin 27. Thus the link is swingable in the plane of the axis of rotation of the swivel block, and is adjustable longitudinally in said bifurcation. Set screwed on the stem 18 (Figure 3) is the segmental gear 28, meshing with the teeth of the toothed sector 29 of the toothed lever 30. The toothed lever is fulcrumed on the reach member 16, by means of the pivot pin 31, and has pivotal connection 32 with the link 25, so that when the link is moved longitudinally the guide wheel 21 will rotate in a plane at right angles to its own.

As shown, the face of the guide wheel is suitably beveled toward the landside and suitably rounded, so that when plowing a furrow the landside face of the wheel will be positioned immediately adjacent the wall of the furrow indicated by the line $b—b$, (Figure 1). As described in the foregoing, the ball and socket joint 11 is adjustable, to hold it positioned nearer to or farther from the center of draft of the tractor, on the side, opposite the plow. As stated in the foregoing, an offset load, burdens one traction wheel and relieves the other, thereby causing the relieved wheel to forge ahead and turn the tractor. For the purpose of automatically guiding the tractor from the adjacent furrow, the ball and socket hitch is positioned on that side of the center of draft of the tractor opposite the plow, so that the tractor will barely tend to turn to the left, the wheel B' forging slightly ahead. The proper position of the connection 11 is found by trial, it having been found by experience, that the offset of the ball and socket connection may be so positioned as to keep the guide wheel 21 directed slightly to the land side as shown in dotted lines, (Figure 1). The rounded face of the wheel prevents breaking down of the furrow wall. As the gear 28 is of small diameter, the wheel revolves at slight side pressure, so that when the side pressure at $a''$ becomes excessive as a result of the tractor having slightly shifted about its center $c$, the gear 28 will actuate the toothed lever 30, which in turn will pull the front of tractor toward the furrow, thereby automatically effecting a steering movement.

In Figure 2 of the drawings, the parts are shown in the positions they assume in the initial portion of a turning movement with the engine at rest, the plow having been previously lifted from the furrow and hung on the hook 7. The tractor is shown as having pivoted in the point c. The link has turned the toothed lever upon its fulcrum 31, which in turn actuated the gear 28 and thereby positioned the guide wheel as indicated. When the engine is running, the tractor pivots on the traction wheel B, in effecting its shortest turn, the parts being so proportioned as to cause the link 25 and the toothed lever 30 to approach a position of longitudinal straight alignment so as to effect a more direct pull on the combined steering and plow hitching device. When said lever and link are so positioned the axis of rotation of the guide wheel will be directed toward the pivot center of the traction wheel B around which the wheel B′ will travel. If the wheel B is caused to travel in a curve in the process of turning, the axis of rotation of the guide wheel will be directed toward the center of said curve. Thus, the horizontal rotary movement of the guide wheel, is so coordinated to the turning movement of the tractor, as to, at all times have its axis of rotation directed toward the center of any curve in which the tractor may be traveling. When the invention is applied to a four wheel tractor, a knee 23, corresponding to the bracket 23 of Figure 1 (Fig. 10) is secured to a part which moves in unison with the steering wheels, such as the axle H carrying the steering wheels I, and having central pivot J. K designates the draw bar of the tractor, the invention being shown hitched in the center of draft.

In large tractors we prefer to use a pair of wheels to form a truck, one of the wheels functioning as a furrow guide similar to the guide wheel 21. This truck comprises a cross bar 33 rotatably secured at right angles to the forward end of the reach member 16, by means of a socket member 34, on said cross bar rotatably fitting over the end of said reach member, said socket having a circumferentially directed slot 35 wherein fits loosely the pin 36 which latter is secured in the reach member. In the ends of the crossbar are journaled the forks 19, similar to the fork of the guide wheel 21, the stems of the forks having squared upper ends. Fitting over the squared portion of the right hand fork is the rearwardly extending lever 37, and over that of the left hand fork is the double lever 38, said levers in parallelism and of equal length. The rearwardly extending portion of the lever 38 and the lever 37 are pivotally connected by the cross-rod 39 so that when the double lever 38 is rocked upon its fulcrum the two forks will turn in unison. On the crossbar 33 are the upstanding bearing studs 40 and 41 whereon are rotatably mounted respectively, a toothed lever similar to the lever 30 and a gear similar to the gear 28, the latter however having a forwardly extending arm 42 corresponding in length to the lever 37, said arm and forward portion of the double lever 38 being connected by a cross strap 43. Thus when the arm 42 is rotated on its stud 41, the forks will move in unison. The truck frame being rotatable on the reach member will yield on uneven ground.

Preferably the guide wheel 44, which travels in the furrow, is of greater diameter than the wheel 45, so that the truck frame will be more nearly level with the ground. The plow connection E′, which is of ordinary type, consists of a cylindrical bushing 46 adapted to be slid over the bar 13, said bushing rotatably fitting the journal of the journal box 47, said journal box having a curved slot to receive the set screw 48 having threaded engagement with the housing 49, said housing supporting a vertically disposed rod 50 which latter slidably fits a vertical bore in the hub 51 at the forward end of the plow frame f. A collar 52 set screwed below the hub 51 serves as a stop to hold the plow at selected levels. A collar 53 one for each end of the journal box, holds the latter positioned on the bar 13. Thus, the plow may swing upwardly on the bushing 46, and horizontally on the rod 50 the angle thereof being adjusted by means of said curved slot and set screw 48. Figure 8 illustrates in dotted lines the positions some of the parts assume when making a turn, the guide wheel 44 being set at a slight angle (dotted lines) as hereinbefore described in connection with the guide wheel 21, and the steering wheels of the tractor leading a trifle away from the furrow.

In operation, the proper position of the ball and socket joint is found by trial, it being easily discernible at the guide wheel, when the tractor leads too violently away from the furrow. The reach member 16 is set over the adjacent furrow so that the guide wheel will properly contact at a″ with the wall of the furrow, and the link 25 adjusted in the swivel block to properly follow the curve defined by the tractor. Obviously the working angle of the wheel with respect to the wall of the furrow, will vary with different types of tractors and is largely dependent upon the distance between the pin 27 and the pivot point c. The tractor shown is easily turned by hand, and responds promptly to the movements of the guide wheel. By having a ball and socket connection at the rear of the device and swivel connection between the tractor and the link, the device will freely yield, on rolling ground. The opening 6 in arm 1 (Fig. 7) permits the bar 13 to move freely up and down. In turning, the operator swings the handle D to the right, at the same time holding the tractor in, to prevent its straight ahead advance so that it will pivot on the wheel B. The pivot 27 being located forward of the tractor, will swing to the left, thereby tending to straighten out the link 25 and the lever 30, and simultaneously setting the guide wheel 21.

The device constitutes a combination tractor guide and antiside draft plow hitch, the guiding feature rendering the device operable by unskilled help and conserving manual effort.

We claim:

1. In a plow hitch and tractor guide, the combination with a tractor, said tractor including oppositely disposed wheels mounted so as to be bodily revoluble about a central pivot point in a horizontal plane to steer the tractor; of a lever pivotally connected to the rear of the tractor and extending outwardly and forwardly along side of and a distance in advance of the tractor, a ground wheel support for said lever mounted at the forward end thereof so as to be revoluble bodily about a vertical axis in the plane of its axis of rotation, the plane of said ground wheel parallel with the planes of said tractor wheels when the tractor is traveling in a straight course, said ground wheel being positioned a distance outwardly away from the tractor, a plow positioned a distance to the rear of said lever and having pivotal connection with the latter at a position to enable the plow to cut a furrow adjacent the trail of said ground wheel, a caster wheel support for the rear of said lever, and mechanism operatively connected with the mounting of said bodily revoluble tractor wheels and of said ground wheel for communicating a revolving motion from one mounting to the other when either is bodily revolved.

2. In a plow hitch, the combination with a wheeled frame and a plow positioned a distance behind the wheeled frame to one side of the center of draft thereof, and in parallelism therewith, so as to cut a furrow in the trail of one of the traction wheels, a member which carries at its front end a ground engaging device extending from a position behind the tractor adjacent the center of draft thereof to a position a distance forward of the tractor, said ground engaging device adapted to ride over the ground and frictionally engage the latter to function as an anchor against lateral movement, means for supporting in elevated position the rear of said ground engaging element, a connection between the plow and said ground engaging element, and a pivotal connection between the rear end of said ground engaging element and the rear of the tractor.

3. In a plow hitch, the combination with a tractor adapted to be turned to pivot on one of the traction wheels and a plow positioned behind the tractor to one side of the center of draft thereof and in parallelism therewith so as to cut the soil outside of the traction wheels, of an angular lever pivotally connected to the rear of the tractor at a position adjacent the center of draft thereof and extending to a position forward of the tractor over the adjacent furrow, a guide wheel adapted to travel in the furrow in the process of plowing, said guide wheel revolubly supported in the forward end of said lever so as to revolve bodily about a vertical axis in the plane of its axis of rotation, a pivotal connection between the plow and said lever, means for holding the rear portion of said lever in elevated position, and mechanism operatively connected to the tractor at a position forward of the traction wheels and extending to said guide wheel and operatively connected therewith for revolving said guide wheel upon its vertical axis, concurrently with a pivotal movement of the tractor upon one of its traction wheels.

4. In a combined plow hitch, and tractor guide the combination with a two wheel tractor constructed to be bodily revoluble horizontally to change its course of travel, and a plow positioned behind the tractor to one side of the center of draft thereof and in parallelism therewith when the tractor is traveling in straight ahead direction, of a lever having pivotal connection with the rear of the tractor extending forwardly to a position located beyond the front of the tractor and outwardly from the side thereof, a ground engaging guide wheel mounted to be bodily revoluble in a horizontal plane on the forward portion of said lever to anchor said lever against lateral movement and to travel in parallelism with the tractor, means for supporting the rear portion of said lever to hold it elevated relative to the ground, and mechanism for operatively connecting the forwardly extending portion of said lever with a part of the tractor which moves away from said lever in the process of turning the tractor said mechanism including devices for bodily revolving said guide wheel to change its direction of travel concurrently with the initial turning movement of the tractor, and bodily moving said lever concurrently with a subsequent turning movement of the tractor.

5. In a combined plow hitch and tractor guide the combination with a tractor constructed to be revolved in a horizontal plane to change its course of travel, and a plow positioned behind the tractor to one side of the center of draft thereof and in parallelism therewith when the tractor is traveling in its normal straight ahead direction, of a lever having pivotal connection with the rear of the tractor extending forwardly to a position located beyond the front of the tractor outwardly from the side thereof, a connection between the plow and the rear of said lever, mechanism operatively connecting said lever to the tractor said mechanism including a ground engaging guide wheel mounted on said lever in a manner to normally travel in parallelism with the tractor, and means coordinated to the turning movement of the tractor whereby a steering movement of said guide wheel will communicate a steering movement to the tractor.

6. In a combined plow hitch and tractor guide, the combination with a two wheel tractor constructed to be bodily revoluble in a horizontal plane to change its course of travel, and a plow positioned behind the tractor to one side of the center of draft thereof and in parallelism therewith when the tractor is traveling in its normal straight ahead direction, of a lever having pivotal connection with the rear of the tractor at a position spaced from the center of draft thereof on the side opposite the plow, said lever extending to a position located in front of the tractor outwardly away from the side thereof, means for connecting the plow to said lever at a position spaced a distance from said pivotal connection with the tractor, said distance constituting a minor portion of the total length of said lever, controlling mechanism including a ground engaging guide wheel on said lever adapted to run in a furrow, operatively connecting the forward part of said lever with a part of the tractor forward of the traction wheels for controlling the steering of the tractor and said guide wheel, the one from the other, to effect a unified forward movement between them, and adjustment means for said pivotal connection between said lever and the tractor, whereby the load may be so concentrated on the tractor relative to the center of draft of the latter, as to cause the tractor to steer sufficiently from a straight ahead direction to constantly steer said guide wheel when running in a furrow, against the landside wall of the latter.

7. In a plow hitch, the combination with a tractor, or a device pivotally connected to the tractor to be drawn thereby, said device extending away from its connection to a position located forward of and a distance away from the side of the tractor, and having a ground engaging element at its forward portion adapted to travel over the ground and constructed so that its engagement with the ground will resist a lateral movement of said device around said pivotal connection, and means for hitching a plow to said device at a position intermediate its ends so that the plow will cut a furrow partly in the trail of the tractor and partly outside of the trail of the tractor.

8. In combination with a tractor, said tractor including steering handles extending longitudinally an appreciable distance rearwardly of the traction wheels thereof whereby the tractor may be revolved bodily to change the direction of travel; of a member pivoted to the rear of the tractor to one side of the line of draft thereof and adjacent the front ends of said handles, said member extending across the line of draft to the outside and forward of the tractor, a furrow wheel carried at the front end of said member to be revoluble bodily about a vertical axis in the plane of its axis of rotation, means operatively connected to the front of the tractor and said furrow wheel and actuated by a steering movement of said handles, for effecting a unified forward movement between them, and means carried by said member rearward of the traction wheels for connecting a plow at any arbitrarily selected position between the draft line and said furrow wheel.

9. In a plow hitch of the class described, a member adapted to be pivotally connected to the rear of a tractor and extending to a point forward and outside thereof, a furrow wheel carried by said member at the front end thereof, means carried by said member between the pivotal connection and said furrow wheel for operatively hitching a plow, and means supported by said member operatively connected to said furrow wheel and adapted to be connected to a part of a tractor which part moves away from the furrow wheel when the tractor is steered to change the direction of travel, whereby to effect a steering movement of said furrow wheel.

10. A plow hitch of the class described, comprising a member adapted to be pivotally connected to the rear of a tractor, said member extending along side of the tractor and carrying a furrow wheel which is located forward of the traction wheels, means carried by said member for operatively hitching a plow so that the plow will turn the soil outside of the traction wheels, and mechanism adapted to be connected to the tractor and operatively connected to said furrow wheel for effecting a steering movement of the latter responsive to and in unison with a steering movement of the tractor.

11. A plow hitch of the class described, comprising a member adapted to be pivotally connected to the rear of a tractor, said member extending along side of the tractor and carrying a furrow wheel which is located forward of the traction wheels, means carried by said member for operatively hitching a plow so that the plow will turn the soil outside of the traction wheels, a vertical shaft carrying said furrow wheel, said shaft intersecting the axis of rotation of the latter to render the furrow wheel rotatable bodily in a horizontal plane, a gear segment on said shaft, a fulcrumed lever the short arm thereof having teeth meshing with said gear segment, and a link adapted to be pivotally connected to a part of the tractor which moves away from said member when the tractor is steered.

12. In a plow hitch, the combination with a tractor; of a structure having pivotal connection with the rear of the tractor and extending to a point located forward and outside thereof, a furrow wheel carried by said member at a point located forward of the tractor, means carried by said member between the said pivotal connection and furrow wheel for operatively hitching a plow, means supported by said member operatively connected to said furrow wheel and adapted to be connected to a part of the tractor in a manner to receive a steering movement therefrom responsive to a turning movement of the tractor, and adjustment means between the tractor and said structure whereby the latter may be bodily moved in parallelism to be pivotally secured to the tractor at selectively different distances therefrom.

In testimony whereof we affix our signatures.

PAUL HANSMANN.
HERMAN STRACK.